(No Model.)
W. A. HOEVELER.
METHOD OF SEALING THE JOINTS OF GAS MAINS.
No. 333,011.  Patented Dec. 22, 1885.
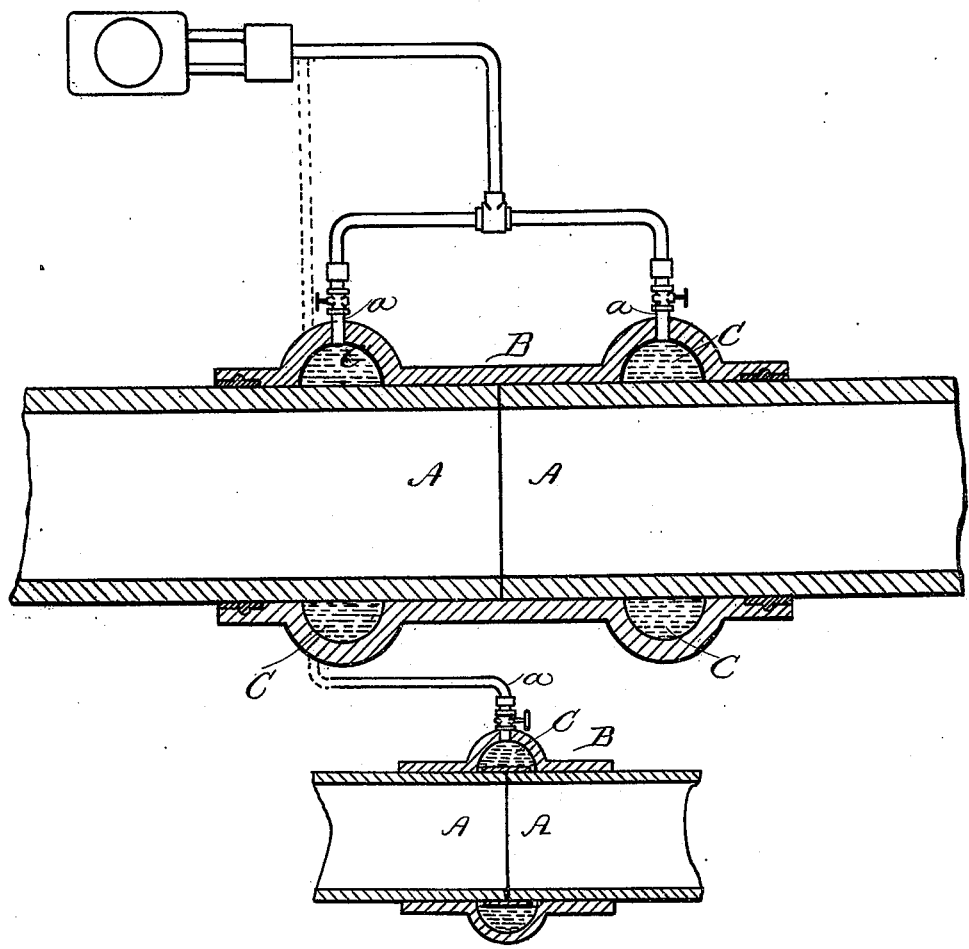

UNITED STATES PATENT OFFICE.

WILLIAM A. HOEVELER, OF PITTSBURG, PENNSYLVANIA.

METHOD OF SEALING THE JOINTS OF GAS-MAINS.

SPECIFICATION forming part of Letters Patent No. 333,011, dated December 22, 1885.

Application filed November 3, 1885. Serial No. 181,765. (No model.)

*To all whom it may concern:*

Be it known that I, WILLIAM A. HOEVELER, a citizen of the United States, residing at Pittsburg, in the county of Allegheny and State of Pennsylvania, have invented a certain new and useful Method of Sealing the Joints of Gas Mains and Pipes; and I do hereby declare the following to be a full, clear, and exact description of the invention, reference being had to the accompanying drawing, which forms part of this specification.

This invention relates to a method of sealing the joints of gas pipes or conduits; and the invention consists, broadly, in the employment, as a sealing medium, of paraffine, spermaceti, or other material under pressure, and its application to the internal or inclosed portions, chambers, or cavities formed in the casings, sleeves, boxes, bowls, or collars used as the mediums for connecting or inclosing the joint of a gas pipe or conduit.

In carrying my invention into effect I employ as a casing or sleeve any of the known or any suitable form applicable to the purpose, such casing being provided with recesses, channels, or grooves, such as is shown, for instance, in the accompanying drawing, wherein—

A A represent the pipe-sections; B, the casing or sleeve joining the same, and C C annular chambers formed therein. These chambers have pipes *a a*, leading to a suitable pump, or other forcing apparatus adapted for the purpose of injecting into the chambers the paraffine or other substance employed as a sealing medium. The sealing substance is admitted to the interior of the casing under a pressure greater than the normal pressure of the gas, and fills all the spaces, holes, or interstices to which it has access, thus completely closing and sealing the joint and preventing the escape of gas.

I do not limit myself to the use of any special form of casing or any particular pumping apparatus, as my invention may be carried into effect in a great variety of ways, which it is unnecessary to describe.

After the sealing material has been introduced it is allowed to harden, and the pump-connections are removed, and the inlet-openings through which the sealing material has been introduced are tightly closed, thus leaving the sealing material in the chambers or casing at a pressure greater than the maximum pressure of the gas in the conduit or pipe.

If it is discovered while the paraffine or other sealing material is being pumped into the chamber or casing that it emerges through any crack, fissure, or opening of the joint, the pumping operation is suspended and the joint calked, packed, or otherwise secured, and the pumping operation is again resumed.

I am aware that it has been proposed to seal the joints of a line of gas pipes or mains by surrounding the joints with chambers into which water is pumped from a source of supply; hence I do not claim, broadly, the method of sealing gas-pipe joints by surrounding them with a liquid substance.

Having fully described my invention, I claim—

1. The method of sealing the joints of gas pipes or conduits, which consists in forcing between the pipe and surrounding casing, under a pressure greater than the normal pressure of the gas, paraffine or other material capable of hardening at a normal temperature.

2. The method of sealing the joints of gas pipes or conduits, which consists in admitting between the pipes and surrounding casing paraffine, and then hermetically sealing the opening through which such material is introduced.

3. The method of sealing the joints of gas pipes or conduits, which consists in forcing between the pipe and a surrounding casing, under a pressure greater than the normal pressure of the gas, paraffine or other substance in a liquid form, and then hermetically sealing the opening through which said liquid has been introduced.

In testimony that I claim the foregoing I have hereunto set my hand this 31st day of October, 1885.

WILLIAM A. HOEVELER.

Witnesses:
THOS. A. CONNOLLY,
C. L. STRAUB.